United States Patent
Kaptur et al.

(10) Patent No.: US 9,311,289 B1
(45) Date of Patent: Apr. 12, 2016

(54) SPREADSHEET DOCUMENT TAB CONDITIONAL FORMATTING

(71) Applicant: Google Inc., Mountain View, CA (US)

(72) Inventors: Joseph John Kaptur, New York, NY (US); Elizabeth Averill Morash, Bernardsville, NJ (US)

(73) Assignee: GOOGLE INC., Mountain View, CA (US)

( * ) Notice: Subject to any disclaimer, the term of this patent is extended or adjusted under 35 U.S.C. 154(b) by 272 days.

(21) Appl. No.: 13/968,879

(22) Filed: Aug. 16, 2013

(51) Int. Cl.
*H03M 5/00* (2006.01)
*H03M 7/00* (2006.01)
*G06F 17/24* (2006.01)

(52) U.S. Cl.
CPC ............ *G06F 17/246* (2013.01); *G06F 17/243* (2013.01); *G06F 17/245* (2013.01)

(58) Field of Classification Search
CPC .... G06F 17/246; G06F 17/245; G06F 17/211
USPC ........................................................ 715/217
See application file for complete search history.

(56) References Cited

U.S. PATENT DOCUMENTS

| | | | |
|---|---|---|---|
| 5,307,484 A | 4/1994 | Baker et al. | |
| 5,345,516 A | 9/1994 | Boyer et al. | |
| 5,416,895 A | 5/1995 | Anderson et al. | |
| 5,600,584 A | 2/1997 | Schlafly | |
| 5,603,021 A | 2/1997 | Spencer et al. | |
| 5,706,449 A | 1/1998 | Liu et al. | |
| 5,809,317 A | 9/1998 | Kogan et al. | |
| 5,842,180 A | 11/1998 | Khanna et al. | |
| 5,910,802 A | 6/1999 | Shields et al. | |
| 5,950,168 A | 9/1999 | Simborg et al. | |
| 6,055,550 A | 4/2000 | Wallack | |
| 6,204,846 B1 | 3/2001 | Little et al. | |
| 6,205,453 B1 | 3/2001 | Tucker et al. | |
| 6,317,758 B1 | 11/2001 | Madsen et al. | |
| 6,430,574 B1 | 8/2002 | Stead | |
| 6,437,812 B1 | 8/2002 | Giles et al. | |
| 6,711,715 B1 | 3/2004 | Grealish | |
| 6,734,883 B1 | 5/2004 | Wynn et al. | |
| 6,738,084 B1 | 5/2004 | Kelley et al. | |
| 6,778,192 B2 | 8/2004 | Arbab et al. | |
| 6,828,988 B2 | 12/2004 | Hudson et al. | |

(Continued)

OTHER PUBLICATIONS

Auto-Hide the Taskbar in Windows XP, Apr. 12, 2006, 3 pages, http://www.xp-tips.com/auto-hide-taskbar-.html.

(Continued)

*Primary Examiner* — Cesar Paula
*Assistant Examiner* — Luu-Phuong Nguyen
(74) *Attorney, Agent, or Firm* — Young Basile Hanlon & MacFarlane P.C.

(57) ABSTRACT

A method of applying conditional formatting rules to a document tab. The method includes receiving an indication of a user input selecting a document entry in a document for applying conditional formatting to the document tab based on the document entry. The method also includes outputting, for display, a conditional formatting user interface for associating one or more conditional formatting rules with the document entry and the document tab. The method further includes receiving an indication of a user input of one or more conditional formatting rules linking a property of the document tab with the document entry. The method further includes changing the property of the document tab based on the one or more conditional formatting rules.

18 Claims, 3 Drawing Sheets

(56) References Cited

U.S. PATENT DOCUMENTS

| | | | |
|---|---|---|---|
| 6,978,443 B2 | 12/2005 | Flanagan et al. | |
| 6,988,241 B1 | 1/2006 | Guttman et al. | |
| 7,009,609 B2 | 3/2006 | Miyadai | |
| 7,101,779 B2 | 9/2006 | Vaartstra et al. | |
| 7,117,430 B2 | 10/2006 | Maguire, III et al. | |
| 7,117,450 B1 | 10/2006 | Chaudhri | |
| 7,266,763 B2 | 9/2007 | Peyton-Jones et al. | |
| 7,275,207 B2 | 9/2007 | Aureglia et al. | |
| 7,546,523 B2 | 6/2009 | Aureglia et al. | |
| 7,752,148 B2 | 7/2010 | Yu et al. | |
| 7,873,946 B2 * | 1/2011 | Lathrop et al. | 717/125 |
| 8,130,205 B2 | 3/2012 | Forstall et al. | |
| 2002/0023105 A1 | 2/2002 | Wisniewski | |
| 2002/0143809 A1 | 10/2002 | Bennett | |
| 2002/0169799 A1 | 11/2002 | Voshell | |
| 2002/0186252 A1 | 12/2002 | Himmel et al. | |
| 2002/0194095 A1 | 12/2002 | Koren | |
| 2003/0188257 A1 | 10/2003 | Aureglia et al. | |
| 2003/0226105 A1 | 12/2003 | Waldau | |
| 2004/0107277 A1 | 6/2004 | Levesque et al. | |
| 2005/0091604 A1 | 4/2005 | Davis | |
| 2005/0183017 A1 | 8/2005 | Cain | |
| 2005/0210403 A1 | 9/2005 | Satanek | |
| 2006/0036939 A1 | 2/2006 | Hobbs et al. | |
| 2006/0070002 A1 | 3/2006 | Guido et al. | |
| 2006/0074866 A1 * | 4/2006 | Chamberlain et al. | 707/3 |
| 2006/0107226 A1 | 5/2006 | Matthews et al. | |
| 2006/0117051 A1 | 6/2006 | Chin | |
| 2006/0184901 A1 | 8/2006 | Dietz | |
| 2006/0224946 A1 | 10/2006 | Barrett et al. | |
| 2006/0288267 A1 * | 12/2006 | DeSpain | G06F 17/246 715/212 |
| 2007/0016872 A1 | 1/2007 | Cummins et al. | |
| 2007/0033518 A1 | 2/2007 | Kenna et al. | |
| 2007/0083541 A1 | 4/2007 | Fraleigh et al. | |
| 2007/0130503 A1 | 6/2007 | Voshell | |
| 2007/0153897 A1 | 7/2007 | Yan | |
| 2007/0234195 A1 | 10/2007 | Wells | |
| 2008/0028340 A1 | 1/2008 | Davis | |
| 2008/0155464 A1 | 6/2008 | Jones et al. | |
| 2008/0229184 A1 | 9/2008 | Prish et al. | |
| 2008/0238938 A1 | 10/2008 | Eklund et al. | |
| 2009/0158139 A1 | 6/2009 | Morris et al. | |
| 2009/0187816 A1 | 7/2009 | Aureglia et al. | |
| 2009/0287673 A1 | 11/2009 | Chronister et al. | |
| 2009/0325607 A1 | 12/2009 | Conway et al. | |
| 2011/0066933 A1 * | 3/2011 | Ludwig | G06F 17/211 715/212 |
| 2011/0148789 A1 | 6/2011 | Kim et al. | |
| 2011/0179110 A1 * | 7/2011 | Soloway | 709/203 |
| 2011/0283227 A1 | 11/2011 | Moore et al. | |

OTHER PUBLICATIONS

Bankoski et al. "Technical Overview of VP8, An Open Source Video Codec for the Web". Dated Jul. 11, 2011.
Bankoski et al. "VP8 Data Format and Decoding Guide" Independent Submission. RFC 6389, Dated Nov. 2011.
Bankoski et al. "VP8 Data Format and Decoding Guide; draft-bankoski-vp8-bitstream-02" Network Working Group. Internet-Draft, May 18, 2011, 288 pp.
David Pogue, "iPhone: The Missing Manual, Forth Edition," Aug. 2010.
Doing it Right: skipping the iPhone url bar, Aug. 5, 2010, 4 pages, http://remysharp.com/2010/08/05/doing-it-right-skipping-the-iphone-url-bar.
Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
Microsoft Excel 2003-2013, "Named Ranges in Excel".
Microsoft Excell 2003, "Creating Custom functions".
Mozilla, "Introduction to Video Coding Part 1: Transform Coding", Video Compression Overview, Mar. 2012, 171 pp.
Overview; VP7 Data Format and Decoder. Version 1.5. On2 Technologies, Inc. Dated Mar. 28, 2005.
Pearson, "The Indirect Function", 1999, pp. 1-2.
Product Feature Tour, Visual Studio Style, Auto Hide Control Bars, Mar. 9, 2004, 2 pages, http://www.bcgsoft.com/featuretour/tour156.htm.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May, 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Teknomo, K. "How to use MS Excel Iterations", 2006, pp. 1-5.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.
Wayne Pan, "JavaScript Pull to Refresh," Jul. 2010.
StackOverflow, "Are there such things as variables within an Excel formula?." 2009.
Actuarial Outpost, Discussion Forum "Excel: Conditional Tab Colors," http://www.actuarialoutpost.com/actuarial_discussion_forum/showthread.php?t=220776, Jul. 2011.
Clark, iWork'09: The Missing Manual, O'Reilly Media, Inc., Apr. 24, 2009, Chapter 20, Using Formulas, 44 pages.
Abraham et al., "How to Communicate Unit Error Message in Spreadsheets" First Workshop on End User Software Engineering, May 21, 2005, St. Louis, Missouri, p. 1-5.

* cited by examiner

SPREADSHEET DOCUMENT TAB
CONDITIONAL FORMATTING

BACKGROUND

The disclosure relates generally to conditional formatting of document tabs.

Many documents, such as spreadsheets, can hold a large amount of information divided between separate pages, or sheets. A spreadsheet document, e.g. a workbook, can include multiple sheets, each sheet including a document tab for identification of the sheet and navigation between sheets within the workbook. The information provided by the document tab can be formatted by a user of the workbook, for example, by the user choosing various properties such as font style, font size, font color, and/or background color related to display of the document tab. Navigation within the document can be simplified when the user chooses to identify one or more groups of sheets in the workbook using, for example, common fonts or background colors for the document tabs identifying each sheet in a given group of sheets. However, if the information within a given sheet were to change in such a way that the document tab properties should also change, the user would need to manually edit the document tab properties.

SUMMARY

The disclosure relates to methods for conditionally formatting document tabs based on document entries.

One aspect of the disclosed embodiments is a method that includes receiving, at a computing device, an indication of a user input selecting a document entry in a document for applying conditional formatting to a document tab based on the document entry; outputting, by the computing device and for display, a conditional formatting user interface for associating one or more conditional formatting rules with the document entry and the document tab; receiving, at the computing device, an indication of a user input of one or more conditional formatting rules linking a property of the document tab with the document entry; and changing, with the computing device, the property of the document tab based on the one or more conditional formatting rules.

Another aspect of the disclosed embodiments is a non-transitory storage medium including program instructions executable by one or more processors that, when executed, cause the one or more processors to perform operations. The operations include receiving an indication of a user input selecting a document entry in a document for applying conditional formatting to a document tab based on the document entry; outputting, for display, a conditional formatting user interface for associating one or more conditional formatting rules with the document entry and the document tab; receiving an indication of a user input of one or more conditional formatting rules linking a property of the document tab with the document entry; and changing the property of the document tab based on the one or more conditional formatting rules.

Another aspect of the disclosed embodiments is an apparatus that includes one or more processors and one or more memory devices for storing program instructions used by the one or more processors. The program instructions, when executed by the one or more processors, cause the one or more processors to: receive an indication of a user input selecting a document entry in a document for applying conditional formatting to a document tab based on the document entry; output, for display, a conditional formatting user interface for associating one or more conditional formatting rules with the document entry and the document tab; receive an indication of a user input of one or more conditional formatting rules linking a property of the document tab with the document entry; and change the property of the document tab based on the one or more conditional formatting rules.

BRIEF DESCRIPTION OF THE DRAWINGS

The description herein makes reference to the accompanying drawings wherein like reference numerals refer to like parts throughout the several views, and wherein.

DETAILED DESCRIPTION

This disclosure describes methods for automatically modifying the properties of a document tab based on the value of a document entry. The modifications are made by applying conditional formatting rules linking the document entry to the document tab. By automating the process, users no longer need to manually change the properties of a document tab to reflect changes to document entries. One method of applying conditional formatting rules includes receiving an indication of a selection of a document entry, displaying a conditional formatting interface, receiving conditional formatting rules linking the selected document entry to properties of a document tab, and finally, applying the conditional formatting rules to automatically change one or more document tab properties based on the value of the document entry.

Figure 1:
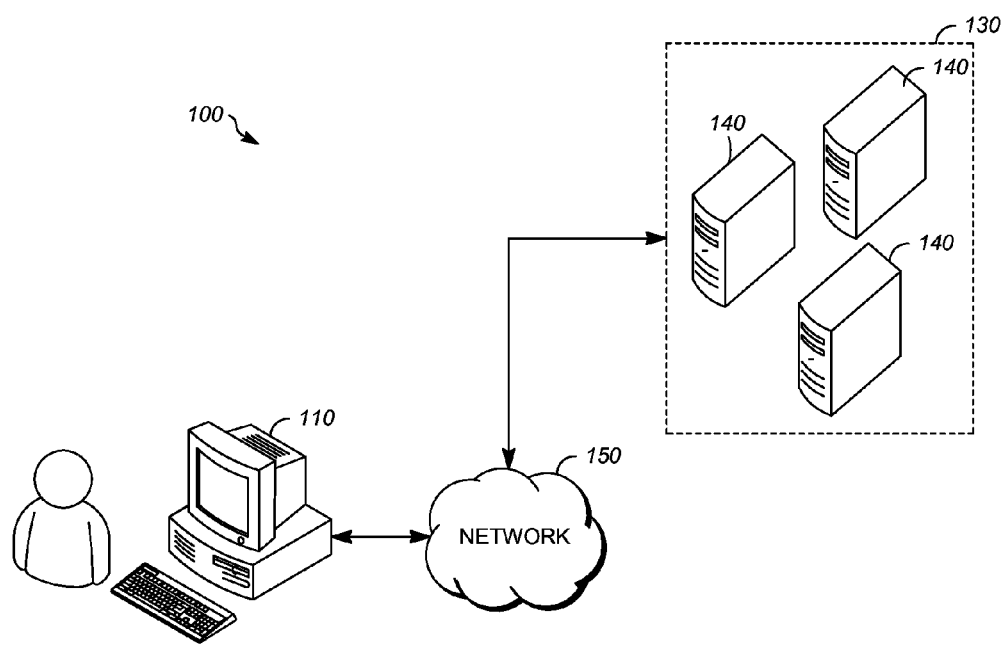
FIG. 1 is a block diagram showing an example of a system for applying conditional formatting rules to a document tab.

FIG. 1 is a block diagram showing an example of an environment 100 in which a system for applying conditional formatting rules to document tabs can be implemented. The environment 100 can include a user system 110 and a conditional formatting system 130. The user system 110 is representative of a large number (e.g. millions) of user systems that can be included in the environment 100. The user system 110 can be any manner of computer or computing device, such as a desktop computer, a laptop computer, a tablet computer, or a smart-phone (a computationally-enabled mobile telephone). The conditional formatting system 130 can be implemented using one or more server computers 140. The user system 110 and the conditional formatting system 130 can each be implemented as a single system, multiple systems, distributed systems, or in any other form.

The systems, services, servers, and other computing devices described here are in communication via a network 150. The network 150 can be one or more communications networks of any suitable type in any combination, including wireless networks, wired networks, local area networks, wide area networks, cellular data networks, and the internet.

The conditional formatting system 130 provides conditional formatting services to the user system 110. In some implementations, all of the operations described here with respect to conditionally formatting document tabs are performed at the conditional formatting system 130. In other implementations, some of the operations described here are performed at the conditional formatting system 130, and the other operations are performed at the user system 110. In other implementations, all of the operations are performed locally at the user system 110.

Figure 2:
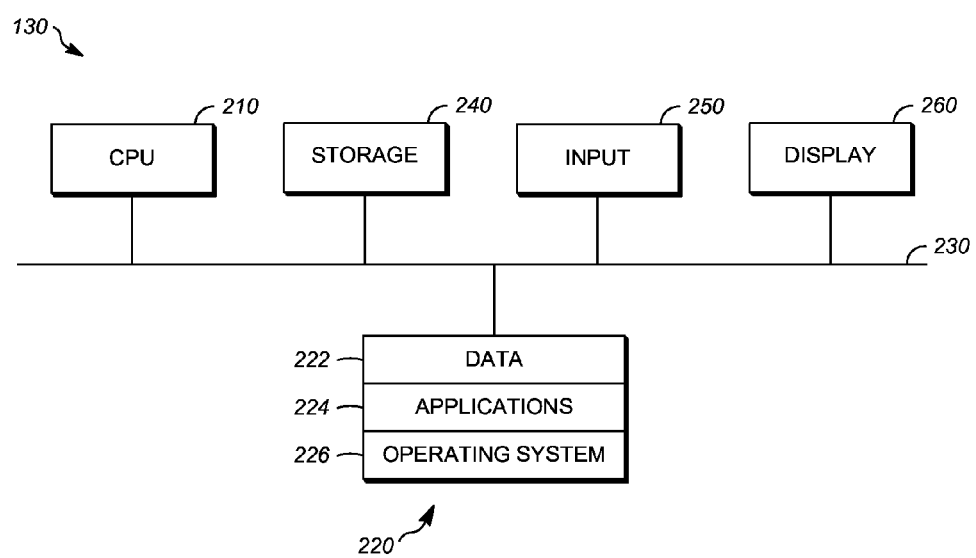
FIG. 2 is a block diagram showing an example of a server computer.

FIG. 2 is a block diagram of an example of a hardware configuration for the one or more server computers 140. The same hardware configuration or a similar hardware configuration can be used to implement the user system 110. Each server computer 140 can include a CPU 210. The CPU 210 can be a conventional central processing unit. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

Each server computer 140 can include memory 220, such as a random access memory device (RAM). Any other suitable type of storage device can be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described herein.

A storage device 240 can be optionally provided in the form of any suitable computer readable medium, such as a hard disk drive, a memory device, a flash drive or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as liquid crystal display (LCD) or a cathode-ray tube (CRT), allows output to be presented to a user, for example, in response to receiving a video signal.

Although FIG. 1 depicts the CPU 210 and the memory 220 of each server computer 140 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of each of each server computer 140 can be composed of multiple buses. Further, the storage device 240 can be directly coupled to the other components of the respective server computer 140 or can be accessed via a network and can comprise a single integrated unit such as a memory card or multiple units such as multiple memory cards. The one or more server computers 140 can thus be implemented in a wide variety of configurations.

Figures 3, 4:
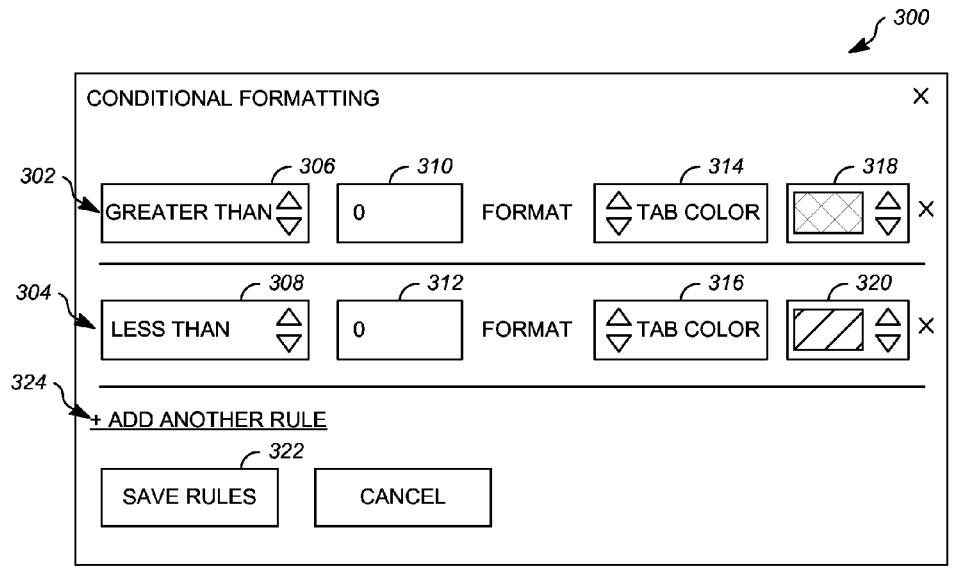
FIG. 3 is an illustration showing an example user interface for entering conditional formatting rules.
FIG. 4 is an illustration showing an example application of conditional formatting rules to document tabs in a spreadsheet-based workbook.

FIG. 3 is an illustration showing an example user interface 300 for entering conditional formatting rules, e.g. conditional formatting rules 302, 304. The user interface 300 can be displayed to the user, for example, at a display associated with the user system 110 after the user selects one or more document entries within a document. Example documents that can receive conditional formatting rules for application to document tabs through the user interface 300 include workbooks including one or more spreadsheets and text documents including one or more pages. When the example document is a workbook including one or more spreadsheets, example document entries can include text, dates, or numerical values present within data cells that make up the spreadsheets. When the example document is a text document including one or more pages, example document entries can include text, dates, or numerical values present within text-entry fields that make up the pages. Additional example document entries are further described in reference to FIG. 4 below.

Each conditional formatting rule, such as conditional formatting rules 302, 304, can be entered, for example, at the user system 110. The information fields associated with the conditional formatting rules 302, 304 can be in the form of, for example, user entries fields and drop-down selection fields. The information fields can include rule-type fields 306, 308, rule-value fields 310, 312, tab-type fields 314, 316, and tab-value fields 318, 320. The user interface 300 can also include a soft button 322 for saving the conditional formatting rules 302, 304 to the conditional formatting system 130 after the information fields have been partially or fully completed. The user interface 300 can also include a selection link 324 for adding additional formatting rules to apply to the associated document entry.

The rule-type fields 306, 308 can be in the form of drop-down selections allowing different types of rules to be applied based on the document entry. Example selections for populating the rule-type fields 306, 308 can include: "text contains," "text equals," "text does not contain," "cell is empty," "cell is not empty," "date is before," "date is after," "date equals," "value is greater than," "value is less than," "value equals," "value is greater than or equal to," "value is less than or equal to," etc. This list of examples is not exhaustive, and other rule types are possible. In the example shown in FIG. 3, the rule-type field 306 is populated with "Greater than" indicating that conditional formatting rule 302 is a value-based rule, that is, a rule that is based on the numerical value of the data entry within the data cell or text-entry field. Rule-type field 308 is similarly populated with "Less than" indicating that conditional formatting rule 304 is also a value-based rule.

The rule-value fields 310, 312 can be in the form of user-entry fields configured to be populated by the user of the conditional formatting system 130. Example user entries can includes numerical values and text values that can be evaluated on the basis of the associated rule-type fields 306, 308. That is, the rule-type fields 306, 308 and rule-value fields 310, 312 are related in that the entries within with rule-value fields 310, 312 are evaluated according to the corresponding entries in the rule-type fields 306, 308. For example, the rule-value field 310 includes the data entry "0" corresponding to the rule-type field 306 data entry of "Greater than." In this case, the document entry being evaluated to apply conditional formatting, e.g. the selected data cell in a spreadsheet, is evaluated to determine if the value within the data cell is "Greater than" "0." Similarly, the rule-value field 312 also includes the data entry "0" corresponding to the rule-type field 308 data entry of "Less than." In this case, the same data cell is also evaluated to determine if the value within the data cell is "Less than" "0." The outcomes of these determinations can be tied to the application of the tab-type fields 314, 316 and tab-value fields 318, 320 by the conditional formatting system 130.

The tab-type fields 314, 316 can be in the form of drop-down selections configured to be populated by the user of the conditional formatting system 130. The tab-type fields 314, 316 allow different types of formatting to be applied to a document tab based on the outcome of the document-entry-based rules set up using the rule-type fields 306, 308 and rule-value fields 310, 312. Example selections for populating the tab-type fields 314, 316 can include: "Tab color," "Tab font size," "Tab font style," "Tab underline," "Tab italicize,"

"Tab font color," etc. This list of examples is not exhaustive, and other rule types are possible. In the example shown in FIG. 3, both tab-type fields 314, 316 are populated with "Tab color" indicating that conditional formatting rules 302, 304 are configured to apply a background color to a document sheet tab based on the application of the rule-type fields 306, 308 and rule-value fields 310, 312 to the document entry selected for conditional formatting.

The tab-value fields 318, 320 can be in the form of drop-down selections configured to be populated by the user of the conditional formatting system 130. Example tab-value fields 318, 320 can include various selections of background colors, font sizes, font styles, font colors, etc. The contents within the tab-value fields 318, 320 can be evaluated on the basis of the associated contents within the tab-type fields 314, 316. For example, the tab-value field 318 for conditional formatting rule 302 includes a representation of a first color "diamond pattern" corresponding to the tab-type field 314 of "Tab color." In this example, if the data cell being conditionally formatted has a value "Greater than" "0" per the entries within the rule-type field 306 and rule-value field 310, the "Tab color" "diamond pattern" will be applied as the background color of the tab representing a spreadsheet within a workbook. In terms of conditional formatting rule 304, the tab-value field 320 includes a representation of a second color "slash pattern" corresponding to the tab-type field 316 of "Tab color." In this example, if the data cell being conditionally formatted has a value "Less than" "0" per the entries within the rule-type field 308 and rule-value field 312, the "Tab color" "slash pattern" will be applied as the background color of the tab. The representative "diamond pattern" and "slash pattern" can indicate colors (e.g. red, green, blue, etc.) as well as patterns or other formats to be applied to a tab. An example application of conditional formatting rules 302, 304 is further described in FIG. 4.

FIG. 4 is an illustration showing an example application of conditional formatting rules, such as conditional formatting rules 302, 304, to document tabs in a spreadsheet-based workbook 400. The example workbook 400 shown includes seven document tabs 402a-g, each of the document tabs 402a-g being identified by a different month of year, from "January" on document tab 402a to "July" on document tab 402g. Based on the number of document tabs 402a-g, the workbook 400 includes seven spreadsheets, each navigable by its document tab 402a-g. The "January" spreadsheet is currently open, and the data cells within the spreadsheet are visible. While open, any of the data cells within the "January" spreadsheet can be selected by the user in order to apply conditional formatting that will affect a property of one of the document tabs 402a-g present in the workbook 400.

Data cell 404 includes the text "January Budget," indicating that this spreadsheet in the workbook 400 includes an example budget for the month of January. The remainder of the document tabs 402b-g are labeled with subsequent months of the year, indicating that the workbook 400 is one including separate spreadsheets each including a past or future monthly budget. Data cell 406 includes the text "Example Expenses" next to data cell 408 including the value "$–8,500.00." This line of data cells 406, 408 indicates that the January expenses equal, or are anticipated to equal, $8,500.00. Data cell 410 includes the text "Example Revenue" next to data cell 412 including the value "$10,000.00." This line of data cells 410, 412 indicates that the January revenue equals, or is anticipated to equal, $10,000. Finally, data cell 414 includes the text "Subtotal" next to data cell 416 including the value "$1,500.00." This line of data cells 414, 416 indicates that the difference between January expenses and revenue, that is, the sum of the two values in data cells 408, 412, equals, or is anticipated to equal, $1,500.00.

Each of the document tabs 402a-g can be conditionally formatted based on one of the data cells in an associated spreadsheet of the workbook 400. For example, data cell 416, representing the difference between actual or projected expenses and revenues in the month of January, can be selected. After selection of the data cell 416, the conditional formatting interface 300 as shown in FIG. 3 can be launched, using any appropriate means such as selection of a soft button, right-click on a mouse, menu selection within the workbook 400, etc. Conditional formatting rules, such as conditional formatting rules 302, 304 can be chosen for application to the data cell 416 and the document tab 402a. In this example, if the value within data cell 416 is "Greater than" "0" the "Tab color" of document tab 402a indicating the January spreadsheet is configured to be "diamond pattern" according to conditional formatting rule 302. If the value within the data cell 416 is "Less than" "0" the "Tab color" of document tab 402a indicating the January spreadsheet is configured to be "slash pattern" according to conditional formatting rule 304. In this example, since the value within data cell 416 is "$1,500.00," a value "Greater than" "0," the document tab 402a has the background color "diamond pattern."

Though data cell 416 selected for this example is part of the spreadsheet indicated by document tab 402a, data cells within different spreadsheets can be used to apply conditional formatting to different document tabs. For example, data cell 416 could be selected in order to apply conditional formatting to document tab 402b including the value "February." Whether the data cell selected for conditional formatting is within the worksheet having the corresponding formatted document tab or is in a different worksheet than the corresponding formatted document tab is up to the user of the conditional formatting system 130. In the example shown in FIG. 4, each of the document tabs 402a-g is conditionally formatted to have either a "diamond pattern" background, for example, indicating a positive subtotal value within the corresponding worksheet or a "slash pattern" background, for example, indicating a negative subtotal value within the corresponding worksheet. A user can thus simply look at the document tabs 402a-g to see which sheets contain deficits or surpluses when each sheet includes a monthly budget.

In prior-art systems, the user would be required to change the format of a document tab manually if the contents of the spreadsheet or page were modified. When a workbook included many spreadsheets, or a text document included many pages, this process was tedious, and updates could be missed or forgotten by the user. The examples described in FIGS. 3 and 4 above detail automatic data-cell driven conditional formatting of document tabs that can save the user time in reviewing workbooks or complex text documents, avoid user errors of forgetfulness, and highlight differences between the outcomes in multiple spreadsheets or pages automatically when the value of one or more data cells is updated.

Figure 5:
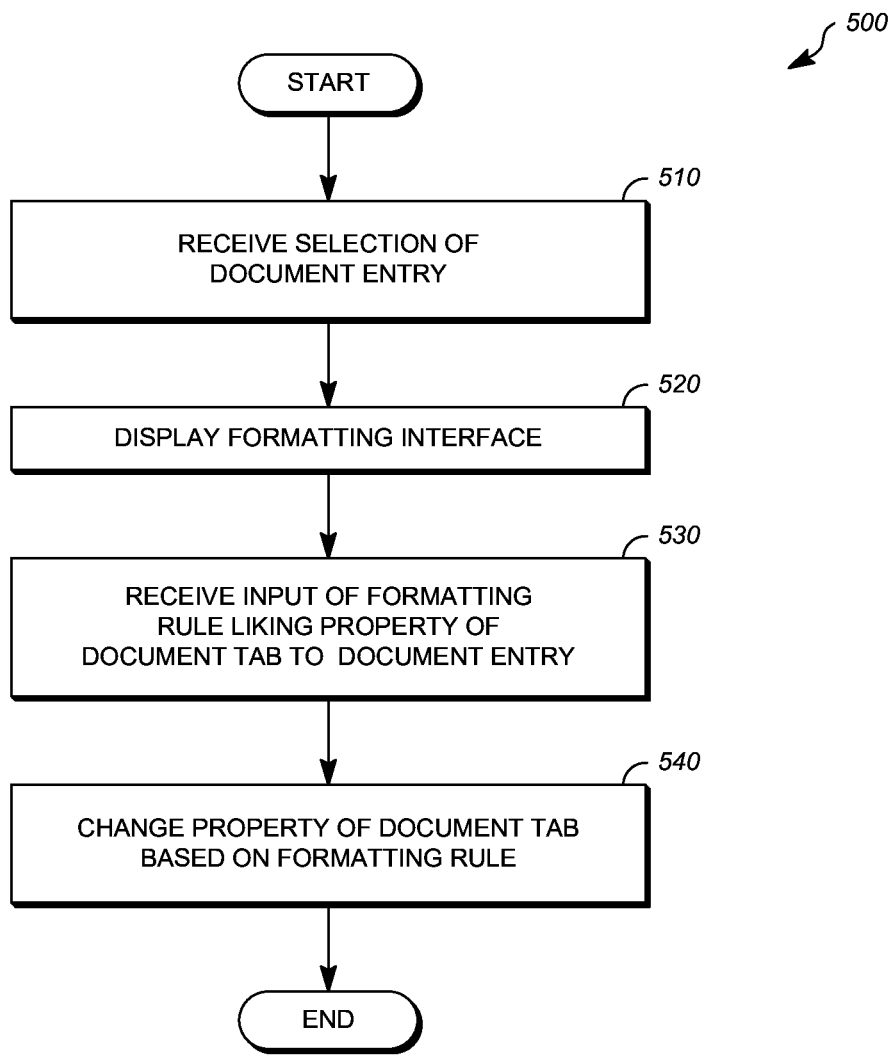
FIG. 5 is a flow chart showing an example of a process for applying conditional formatting rules to a document cell and a document tab.

FIG. 5 is a flow chart showing an example of a process 500 for applying conditional formatting rules to a document cell and a document tab. The operations described in connection with the process 500 can be performed at one or more computers, such as at the one or more server computers 140 of the conditional formatting system 130. As used herein, the phrases "one or more computers," "one or more computing devices," "one or more server computers," and similar phrases include all of the computers or groups of computers that participate in performing the process. For example, the process 500 can be performed at one or more computers in an implementation where each of the operations described here is performed using a different group of computers, where each group of computers cooperatively performs the respective operation of the process 500.

When an operation is performed by one or more computers, it is completed when it is performed by one computer. The operations described in connection with the example process 500 can be embodied as a non-transitory computer readable storage medium including program instructions executable by one or more processors that, when executed, cause the one or more processors to perform the operations. For example, the operations described in connection with the example process 500 could be stored at the memory 220 of a respective one of the server computers 140 and be executable by the CPU 210 thereof.

At operation 510, an indication is received at the conditional formatting system 130 reflecting a user input selecting a document entry in a document for applying conditional formatting to a document tab based on the document entry. For example, as described in reference to FIG. 4, the document entry selected can be a data cell in a spreadsheet, such as data cell 416 having a value of "$1,500.00" that indicates a monthly budget surplus for the month of January in the example workbook 400. In another example, the document can be a text document including text-entry fields and the document entry can be one or more of the text-entry fields within the text document. Other types of documents can also include selectable document entries.

The selection of the document entry can be made in any manner, for example, by the user left-clicking a mouse on a display of the document entry, by highlighting or hovering over the displayed document entry with a mouse pointer, or by using a gesture such as a swipe to select the displayed document entry. The indication that the user wishes to apply conditional formatting to the document entry can similarly be made in any manner, for example, by right-clicking a mouse after the document entry was selected, by selecting a pull-down menu including a conditional formatting command after the document entry was selected, or by using another designated gesture indicative of applying conditional formatting after the document entry was selected. Alternatively, the selection of the document entry and indication of the user's desire to apply conditional formatting can be completed in a simultaneous manner.

At operation 520, a computing device, such as user system 110 or one or more of the server computers 140, outputs a conditional formatting user interface, such as user interface 300, for display to the user. The user interface 300 can be configured to allow the user to apply conditional formatting rules, such as conditional formatting rules 302, 304, to a document tab based on the selected document entry. As described above in reference to FIG. 4, the document tab can identify a document sheet including the document entry or the document tab can identify a different document sheet than the document sheet including the document entry. The link between the document entry and the document tab allows for automatic updating of the conditional formatting applied to the document tab based on the value of the document entry.

At operation 530, the conditional formatting system 130 receives an indication of a user input of one or more conditional formatting rules linking a property of the document tab with the document entry. The conditional formatting rules can be text-based rules, fill-based rules, date-based rules, or value-based rules. An example of a text-based rule is one based on the contents of a document entry including or excluding specific text. An example of a fill-based rule is one based on the contents of a document entry including or excluding any value, that is, being blank or being filled. An example of a date-based rule is one based on the contents of a document entry being associated with a specific date. An example of a value-based rule is one based on the contents of a document entry being associated with a specific number. As described in reference to FIGS. 3 and 4, the example conditional formatting rules 302, 304 are value-based rules that link the numerical value of data cell 416 in the "January" spreadsheet in workbook 400 to a property of one of the document tabs, such as document tab 402a. The properties associated with document tabs can include background color, font style, font size, and font color.

At operation 540, the conditional formatting system 130 changes the property of the document tab based on one or more of the conditional formatting rules. Continuing with the example from FIGS. 3 and 4, conditional formatting rule 302 is applied to document tab 402a since the value of data cell 416, "$1,500.00," is "Greater than" "0" as required by the rule-type field 306 and the rule-value field 310. Given the satisfaction of the rule-type field 306 and the rule-value field 310 conditions, the conditional formatting of "Tab color" of "diamond pattern" will be applied to document tab 402a as required by the tab-type field 314 and the tab-value field 318. Conditional formatting rule 304 is also applied to document tab 402a, but because the value of data cell 416, "$1,500.00," in not "Less than" "0" as required by the rule-type field 308 and the rule-value field 312, no change is made to the property of document tab 402a based on conditional formatting rule 304. Once the spreadsheet receives instruction to analyze the value of the document entry based on the one or more conditional formatting rules, the property of the document tab 402 can be changed.

As an extension to the example process 500 described above, the spreadsheet can continuously analyze the document entry, listening for changes to the value of the document entry, and re-compute and apply the applicable conditional formatting rules, such as conditional formatting rules 302, 304, as necessary. The analysis of the document entry ends only when the formatting rule is removed. Given the continuous analysis, the properties of the document tab will stay in sync with the data entry without the user having to update them manually.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described here. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A computer-implemented method, comprising:
   outputting, at a computing device and for display, a spreadsheet document that includes one or more data cells and a document tab;
   receiving, at a computing device, an indication of a user input selecting a document entry in the spreadsheet document for applying conditional formatting to the document tab based on the document entry, wherein the document entry is one or more of the one or more data cells of the spreadsheet document;
   outputting, by the computing device and for display in response to the user input selecting the document entry in the spreadsheet document, a conditional formatting user interface for associating one or more conditional formatting rules with the document entry and the document tab;
   receiving, at the computing device, an indication of a user input of one or more conditional formatting rules linking a property of the document tab with the document entry; and
   changing, with the computing device, the property of the document tab based on the one or more conditional formatting rules.

2. The method of claim 1, wherein the property of the document tab is one of background color, font style, font size, and font color.

3. The method of claim 1, wherein the one or more conditional formatting rules include at least one of text-based rules, fill-based rules, date-based rules, and value-based rules.

4. The method of claim 1, wherein the document tab identifies a document sheet including the document entry.

5. The method of claim 1, wherein the document tab identifies a different document sheet than a document sheet including the document entry.

6. The method of claim 1, further comprising:
subsequent to changing the property of the document tab, monitoring the document entry and updating the property of the document tab in response to a change to the document entry.

7. A non-transitory storage medium including program instructions executable by one or more processors that, when executed, cause the one or more processors to perform operations, the operations comprising:
outputting, for display, a spreadsheet document that includes one or more data cells and a document tab;
receiving an indication of a user input selecting a document entry in the spreadsheet document for applying conditional formatting to the document tab based on the document entry, wherein the document entry is one or more of the one or more data cells of the spreadsheet document;
outputting, for display in response to the user input selecting the document entry in the spreadsheet document, a conditional formatting user interface for associating one or more conditional formatting rules with the document entry and the document tab;
receiving an indication of a user input of one or more conditional formatting rules linking a property of the document tab with the document entry; and
changing the property of the document tab based on the one or more conditional formatting rules.

8. The non-transitory storage medium of claim 7, wherein the property of the document tab is one of background color, font style, font size, and font color.

9. The non-transitory storage medium of claim 7, wherein the one or more conditional formatting rules include at least one of text-based rules, fill-based rules, date-based rules, and value-based rules.

10. The non-transitory storage medium of claim 7, wherein the document tab identifies a document sheet including the document entry.

11. The non-transitory storage medium of claim 7, wherein the document tab identifies a different document sheet than a document sheet including the document entry.

12. The non-transitory storage medium of claim 7, the operations further comprising:
subsequent to changing the property of the document tab, monitoring the document entry and updating the property of the document tab in response to a change to the document entry.

13. An apparatus, comprising:
one or more processors; and
one or more memory devices for storing program instructions used by the one or more processors, wherein the program instructions, when executed by the one or more processors, cause the one or more processors to:
output, at a computing device and for display, a spreadsheet document that includes one or more data cells and a document tab;
receive an indication of a user input selecting a document entry in the spreadsheet document for applying conditional formatting to a document tab based on the document entry, wherein the document entry is one or more of the one or more data cells of the spreadsheet document;
output, for display in response to the user input selecting the document entry in the spreadsheet document, a conditional formatting user interface for associating one or more conditional formatting rules with the document entry and the document tab;
receive an indication of a user input of one or more conditional formatting rules linking a property of the document tab with the document entry; and
change the property of the document tab based on the one or more conditional formatting rules.

14. The apparatus of claim 13, wherein the property of the document tab is one of background color, font style, font size, and font color.

15. The apparatus of claim 13, wherein the one or more conditional formatting rules include at least one of text-based rules, fill-based rules, date-based rules, and value-based rules.

16. The apparatus of claim 13, wherein the document tab identifies a document sheet including the document entry.

17. The apparatus of claim 13, wherein the document tab identifies a different document sheet than a document sheet including the document entry.

18. The apparatus of claim 13, wherein the program instructions further cause the one or more processors to:
subsequent to changing the property of the document tab, monitor the document entry and update the property of the document tab in response to a change to the document entry.

* * * * *